(12) United States Patent
Mueller et al.

(10) Patent No.: US 7,856,569 B2
(45) Date of Patent: Dec. 21, 2010

(54) METHOD AND DEVICE FOR A SWITCHOVER AND FOR A DATA COMPARISON IN A COMPUTER SYSTEM HAVING AT LEAST TWO PROCESSING UNITS

(75) Inventors: Bernd Mueller, Gerlingen (DE); Ralf Angerbauer, Schwieberdingen (DE); Eberhard Boehl, Reutlingen (DE); Yorck von Collani, Beilstein (DE); Rainer Gmehlich, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 282 days.

(21) Appl. No.: 11/665,727

(22) PCT Filed: Oct. 25, 2005

(86) PCT No.: PCT/EP2005/055511

§ 371 (c)(1),
(2), (4) Date: Oct. 28, 2008

(87) PCT Pub. No.: WO2006/045784

PCT Pub. Date: May 4, 2006

(65) Prior Publication Data

US 2009/0055674 A1    Feb. 26, 2009

(30) Foreign Application Priority Data

| Oct. 25, 2004 | (DE) | .......... 10 2004 051 937 |
|---|---|---|
| Oct. 25, 2004 | (DE) | .......... 10 2004 051 950 |
| Oct. 25, 2004 | (DE) | .......... 10 2004 051 952 |
| Oct. 25, 2004 | (DE) | .......... 10 2004 051 964 |
| Oct. 25, 2004 | (DE) | .......... 10 2004 051 992 |
| Aug. 8, 2005 | (DE) | .......... 10 2005 037 243 |

(51) Int. Cl.
- G06F 1/00 (2006.01)
- G06F 1/12 (2006.01)
- G06F 15/00 (2006.01)
- G06F 11/00 (2006.01)

(52) U.S. Cl. .......... 713/500; 713/375; 713/400; 712/28; 712/32; 712/229; 714/10; 714/703; 714/746; 714/799

(58) Field of Classification Search .......... 713/375, 713/400, 500; 712/28, 32, 229; 714/10, 714/703, 746, 799
See application file for complete search history.

(56) References Cited

U.S. PATENT DOCUMENTS 3,783,250 A   1/1974   Fletcher et al.
(Continued)

FOREIGN PATENT DOCUMENTS

EP   0 384 177   8/1990
(Continued)

OTHER PUBLICATIONS

Urban et al.: "A Survival Avionics System for Space Applications," Int. Symposium on Fault-tolerant Computing, FTCS-28 (1998), pp. 372-381.

Primary Examiner—Stefan Stoynov
(74) Attorney, Agent, or Firm—Kenyon & Kenyon LLP

(57) ABSTRACT

A method and a device are provided for performing switching and data comparison in a computer system having at least two processing units which each process data at a specified clock pulse, in which a switchover arrangement is provided and switching takes place between at least two operating modes, and a comparison unit is provided. A first operating mode corresponding to a compare mode is provided, and a second operating mode corresponding to a performance mode is provided. A synchronization arrangement is provided which assigns to the specifiable data a clock pulse information as a function of a processing unit, and at least the comparison unit takes into consideration this clock pulse information in the corresponding data.

15 Claims, 20 Drawing Sheets

U.S. PATENT DOCUMENTS

| | | |
|---|---|---|
| 4,733,353 A | 3/1988 | Jaswa et al. |
| 5,226,152 A * | 7/1993 | Klug et al. ................. 714/12 |
| 5,233,615 A | 8/1993 | Goetz et al. |
| 6,389,041 B1 | 5/2002 | Morita et al. |
| 6,625,749 B1 * | 9/2003 | Quach ........................ 714/10 |
| 7,055,060 B2 * | 5/2006 | Nguyen et al. ............... 714/11 |
| 7,237,144 B2 * | 6/2007 | Safford et al. ............... 714/11 |
| 2004/0186979 A1 | 9/2004 | Janke et al. |

FOREIGN PATENT DOCUMENTS

| | | |
|---|---|---|
| EP | 0 969 373 | 1/2000 |
| WO | WO 01/46806 | 6/2001 |
| WO | WO 2004/061666 | 6/2004 |

* cited by examiner

METHOD AND DEVICE FOR A SWITCHOVER AND FOR A DATA COMPARISON IN A COMPUTER SYSTEM HAVING AT LEAST TWO PROCESSING UNITS

BACKGROUND OF THE INVENTION

1. Field of the Invention

The present invention relates to a method and a device for performing switching and data comparison in a computer system having at least two processing units.

2. Description of Related Art

A method for detecting errors in a comparative mode is described in published international patent document WO 01/46806. In this context, the data are processed in parallel in a processing unit having two processing unit ALU's and are compared. In this published document, if there is an error (soft error, transient error), both ALU's work independently of each other until the erroneous data have been removed, and a renewed (partially repeated) redundant processing can be undertaken. This assumes that both ALU's work synchronously with each other, and that the results can be compared in a clock accurate manner.

Methods are known in the related art as to how one may switch over between a comparative mode for error detection, in which tasks are executed redundantly, and a performance mode for achieving greater working capacity. The condition is that the processing units for the comparative mode are synchronized with respect to each other. For this, it is required that the two processing units are able to be stopped and that they work synchronously with clock accuracy, in order to be able to compare to one another the resulting data as they are written into the memory. This calls for interventions in the hardware, and individual design approaches are proposed.

In published European Patent EP 0969373, by contrast, a comparison of the results of redundantly working processing units or processing units are assured even when they work asynchronously with respect to each other, that is, not with clock accuracy, or having an unknown clock pulse offset.

Voting systems are known from the aircraft industry which are able to use inputs from standard computers, and are able to process these safely by a voter-basis decision, and thereby are able to trigger safety-relevant actions. One system which combines inter-processing unit and inter-control unit communications with each other is the FME system, in which, because of a high degree of redundancy, the system remains operational even in the case of individual or even a plurality of errors, and which was developed by DASA for space flight—see, e.g., (Urban, et al.): "A survivable avionics system for space applications," Int. Symposium on Fault-tolerant Computing, FTCS-28 (1998), pp. 372-381). This system can even tolerate byzantine errors (that is, especially nasty errors in a case where not all components receive the same information, but a schemer even "deliberately" distributes different wrong information to various components). Such a system is commercially applicable, because of its high cost, for particularly critical systems which are manufactured in very small numbers. A cost-effective design approach is not known that can be produced in large numbers and additionally has switchover facilities. Therefore there exists the object of creating a switchover and compare unit which permits switching over the operating mode of two or more processing units, and, in this context, is able to do without interventions in the structure of these processing units and also requires no additional signals for this purpose. In this context, it is supposed to be possible to compare to one another various digital or analog signals from various processing units in a comparative mode. In this context, under certain circumstances, this comparison should even be possible if the processing units are operated using different clock pulse signals, and not synchronously with respect to one another. Beyond that, it is the object of the present invention to make available means and methods by which the comparison is also able to be carried out using various clock pulses.

BRIEF SUMMARY OF THE INVENTION

Advantageously, a method is used for switching over and for data comparison in a computer system having at least two processing units of which each processes at a specified clock pulse, switchover means being provided and switching over taking place between at least two operating modes; means of comparison being provided and a first operating mode corresponding to a comparison mode and a second operating mode corresponding to a performance mode, wherein synchronization means are provided which assign to the specifiable data clock pulse information as a function of a processing unit, and at least the means of comparison take into consideration this clock pulse information in the case of the corresponding data.

Advantageously, a method is used in which the synchronization means include at least storage means, and specifiable data having clock information assigned to them are stored in the storage means.

Advantageously, a method is used in which further processing takes place of specifiable data as a function of clock information assigned to these data.

Advantageously, a method is used in which preparation takes place of the specifiable data in the clock information assigned to these data.

Advantageously, a method is used in which the data are buffered before input into the means of comparison.

Advantageously, a method is used in which a handshake interface is provided in such a way that a data reception is acknowledged.

Advantageously, a method is used, in which a specification that the next output datum is to be compared takes place by a compare signal.

Advantageously, a method is used, in which a datum which is to be compared has an identifier assigned to it, by which the comparison is triggered.

Advantageously, a device is used for switching over and for data comparison in a computer system having at least two processing units of which each processes at a specified clock pulse, switchover means being included and switching over taking place between at least two operating modes; means of comparison being included and a first operating mode corresponding to a comparison mode and a second operating mode corresponding to a performance mode, wherein synchronization means are included which are designed in such a way that clock information is assigned to the specifiable data as a function of a processing unit, and the means of comparison are designed in such a way that they take into consideration the clock information in the case of the corresponding data.

Advantageously, a device is used in which the synchronization means include at least storage means, and the latter are designed in such a way that specifiable data having clock information assigned to them are stored in the storage means.

Advantageously, a device is used in which the storage means is a FIFO memory.

Advantageously, a device is used in which a synchronization means is assigned to each processing unit.

Advantageously a device is used in which the switchover means and the means of comparison are developed as a switchover unit and a comparative unit and are assigned to each other.

Advantageously a device is used in which at least one input buffer memory is provided which is developed in such a way that the data are buffered before input into the means of comparison.

Advantageously, a device is used in which a handshake interface is provided in such a way that a data reception is acknowledged.

DETAILED DESCRIPTION OF THE INVENTION

Figure 1:
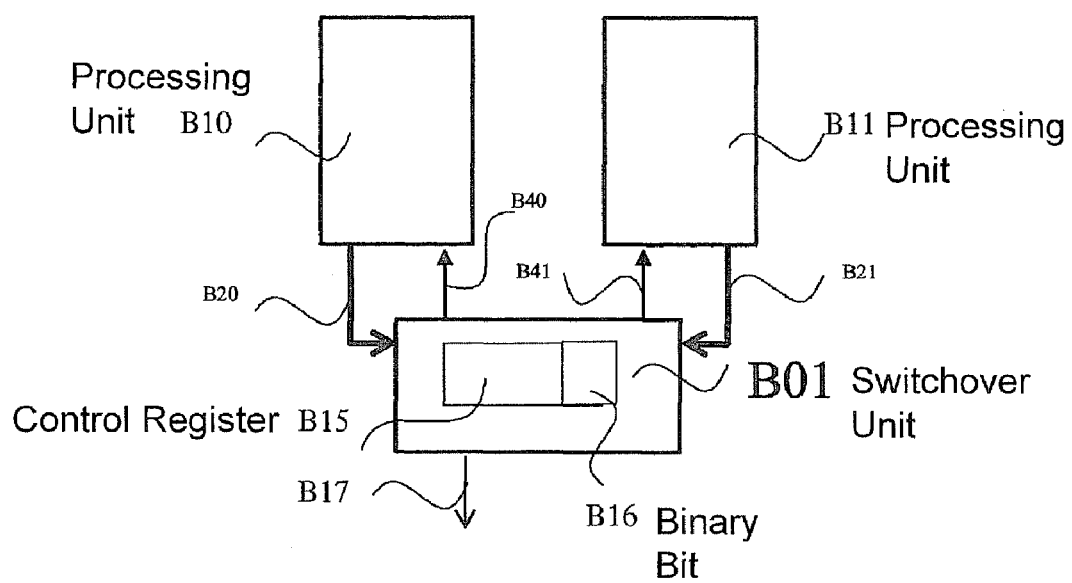
FIG. 1 shows the basic function of a switchover and comparative unit for two processing units.

In the following text, an execution unit or a processing unit may designate both a processor/core/CPU, as well as an FPU (floating point unit), a DSP (digital signal processor), a co-processor or an ALU (arithmetic logical unit).

An example system includes two or more processing units. Basically, in safety relevant systems, there is the possibility of using such resources either for increasing the performance capability by providing the various processing units as much as possible with different tasks. Alternatively, some of the resources may also be redundantly to one another, by providing them with the same task, and by detecting an error in the case of unequal results.

A plurality of modes is conceivable, depending on how many processing units there are. In a dual system, the two modes "compare" and "performance" exist as described above. In a triple system, besides the pure performance mode, in which all three processing units work in parallel, and the pure comparative mode, in which all three processing units calculate redundantly and a comparison is made, one may also implement a 2-out-of-3 voting mode, in which all three processing units calculate redundantly and a majority selection is undertaken. A mixed mode may also be implemented in which, for instance, two of the processing units calculate redundantly with respect to each other, and the results are compared, while the third processing unit is working on a different, parallel task. In a system of four or more processing units, still further combinations are clearly conceivable.

An object to be attained is that processing units made available are able to be inserted variably into a system in operation, without making necessary an intervention in the existing structure of these processing units (e.g. for synchronization purposes). In one example embodiment, each processing unit is to be able to operate at its own clock pulse, that is, the processing of the same tasks for comparison purposes may also be done asynchronously with respect to each other.

This object is attained in that a universal, broadly insertable IP is created, which makes possible a switchover of the operating modes (e.g., comparative mode, performance mode or voting mode) at any desired point in time without previous switching off of the processing units, and manages the comparison or the voting of the data streams that are possibly asynchronous to one another. This IP is able to be designed as a chip, or it may be integrated on a chip together with one or more processing units. Furthermore, it is not a condition that this chip is made up of only one piece of silicon, it is entirely also possible that it is implemented made up of separate components.

In order to ensure synchronicity between different processing units, signals are required which prevent a steadily continuing program processing of individual processing units. For this, a WAIT signal is usually provided. If an embodiment unit does not have a wait signal, it may also be synchronized via an interrupt. For this, the synchronization signal (e.g., M140 in FIG. 2) is not guided to a wait input, but applied to an interrupt. This interrupt must have a sufficiently high priority, with respect to the processing program and also with respect to other interrupts, in order to interrupt the normal working procedure. The appertaining interrupt routine executes only a certain number of NOP's (dummy instructions having no effect on data), before the system reverts again to the interrupted program, and thereby delays the further processing of the processing program. If necessary, in the interrupt routine, the usual storage operations at the beginning and at the end still have to be undertaken, so as not to impair the normal program processing by the interrupt.

This procedure is continued until the synchronicity has been produced (e.g., other processing units deliver the expected comparative data). However, an exact clock pulse synchronicity, and especially an in-phase condition with other processing units, can only be guaranteed conditionally using this method. Therefore, when using the interrupt signal for synchronization, the data to be compared may be buffer-stored in the UVE before they are compared.

An advantage of the present invention is that any commercially available standard structures may be inserted, because no additional signals are required (no intervention in the hardware structure) and any desired output signals of these components are able to be monitored, which, for instance, are used directly for controlling actuators. This includes the checking of converter structures, such as DAC's and PWM's, which up to now, according to the state of the art, are not so directly able to be checked by a comparison.

Provided the checking for individual tasks or SW tasks is not required, however, switching over into a performance mode is also possible, in which different tasks are distributed to various processing units.

An additional advantage is that, in a comparative mode or a voting mode, not all data have to be compared. Only the data to be compared or voted are synchronized to one another in the switchover unit and the comparative unit. The selection of these data is variable (programmable) because of the specific response of the switchover and compare unit, and is able to be adjusted to the respective processing unit architecture as well as to the application involved. This being the case, the use of diverse μCs or software parts is easily possible, since only results which can be meaningfully compared are also actually compared.

Furthermore, access to a (for instance, external) memory can be monitored thereby, or even only the control of external I/O modules. Internal signals are able to be checked via the software-controlled additional output to the switchover module on the external data bus and/or address bus.

All control signals for the compare operations are generated in the preferably programmable switchover unit and voting unit, and the comparison also takes place there. The processing units (e.g., processors), whose outputs are to be compared to one another, are able to use the same program, a duplicated program (which additionally makes possible the detection of errors during memory access) or even a diversified program for the detection of software errors. In this context, not all the signals made available by the processing units have to be compared to one another, but it is also possible, by using an identifier (address signal or control signal) to provide certain signals for the comparison or not to do that. This identifier is evaluated in the switchover and comparative device and the comparison is controlled thereby.

Separate timers monitor deviations in the time response beyond a specifiable limit. Some, or even all modules of the switchover and comparative unit are able to be accommodated integrated on a chip, on a common board, or even spatially separated. In the last case, the data and control signals are exchanged with each other via suitable bus systems. Registers are then locally written on via the bus system, and control the procedures by using the data stored therein and/or the addresses/control signals.

FIG. 1 shows the basic function of the switchover unit according to the present invention BO1 for the application in connection with two processing units B10 and B11. Various output signals, such as data, control signals and address signal B20 or B21 of processing units B10 and B11 are connected to switchover unit BO1. In addition, there is at least one synchronization signal, in the embodiment of the system according to the present invention, B40 and B41, which is connected to one of the comparative units.

The switchover unit includes at least one control register B15, which has at least one memory element for a binary sign (bit) B16, which switches over the mode of the comparative unit. B16 is able to assume at least the two values 0 and 1, and may be set or reset by signals B20 or B21 of the processing units or by internal processes of the switchover unit.

If B16 is set to the first value, the switchover unit operates in the comparative mode. In this mode, all arriving data signals from B20 are compared to the data signals from B21, provided certain specifiable compare conditions of the control signals and/or address signals from signals B20 and B21 are satisfied, which signal the validity of the data and the provided comparison for these data.

If these compare conditions on both signals B20 and B21 are satisfied at the same time, the data from these signals are immediately compared, and, if they are unequal, an error signal B17 is set. Now, if the compare condition from either the signals B20 and B21 is satisfied, the corresponding synchronization signal B40 or B41 is set. In the corresponding processing unit B10 or B11, this signal has the effect of stopping the processing, and therewith the prevention of the step enabling of the corresponding signals, which up to then were not able to be compared to one another. Signal B40 and/or B41 remains set until the corresponding compare condition of the respectively other processing unit B21 or B20 is satisfied. In this case the comparison is carried out, and the corresponding synchronization signal is reset.

In the non-simultaneous preparation, as described above, of the data to be compared by the two processing units, in order to ensure the comparison, it is either necessary to hold the data and compare conditions of the respective processing unit to the corresponding value until the corresponding synchronization signal B40 or B41 is reset, or the data first made available have to be stored in the switchover unit until the comparison takes place.

Depending on which processing unit first makes data available, that one has to wait with further processing of its program or its processes until the other processing unit makes available the corresponding comparison data.

In one example embodiment of the switchover unit according to FIG. 1, one may do without one of the signals B40 or B41 if it is always ensured that the appertaining processing unit does not make available comparison data before the other processing unit.

If B16 is set to the second value, synchronization signals B20 and B21 as well as error signal B17 are always inactive, and are set to the value 0, for instance. Also, no comparison takes place, and the two processing units work independently of each other.

Figure 1A:
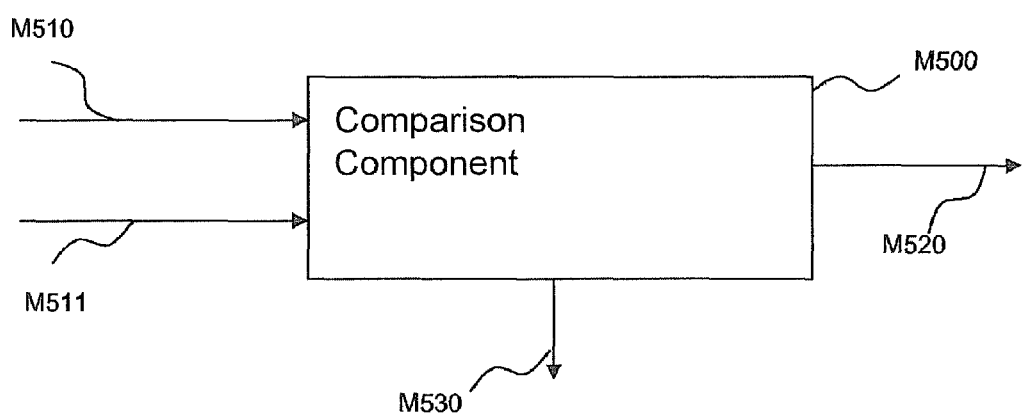
FIG. 1a shows a generalized representation of a comparator.

The comparator is an essential component of the system according to the present invention. It is shown in its simplest form in FIG. 1a. Comparison component M500 is able to pick up two input signals M510 and 511. It then compares them for equality, in the context shown here, within the meaning of bit-wise equality, for example. If it detects inequality, error signal M530 is activated and signal M520 is deactivated. In the case of equality, the value of input signals M510, M511 is given to output signal M520, and error signal M530 does not become active, that is, it signals the "good" condition. Based on this basic system, a multiplicity of varied example embodiments is conceivable. First of all, component M500 may be designed as a so-called TSC component (totally self checking). In this case, error signal M530 is conducted outside, on at least two lines ("dual rail"), and it is ensured by internal design discovery measures and error discovery measures that, in every possible error case of the comparison component, this signal is present in a correct or detectably incorrect manner. One example embodiment of the system according to the present invention incorporates such a TSC comparator.

Figure 1B:
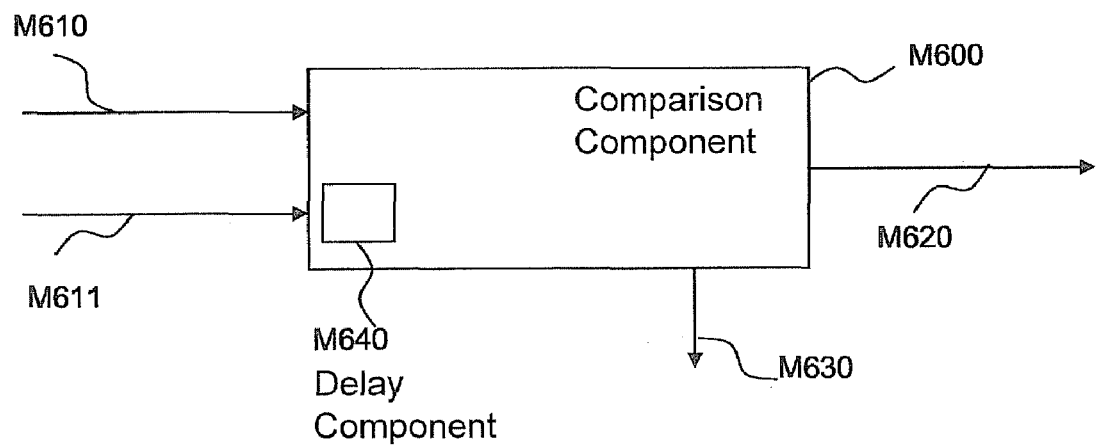
FIG. 1b shows a generalized representation of a switchover and comparative unit.

A second class of example embodiments may be distinguished to the effect of what degree of synchronicity the two inputs M510, M511 (or M610, M611) have to have. One possible variant is characterized by clock-pulse-wise synchronicity, that is, the comparison of the data is able to be carried out in one clock pulse. A slight change is created in that, in response to a fixed phase shift between the inputs, a synchronous delay element is used, which delays the corresponding signals, for example, by whole numbered or even half clock pulse periods. Such a phase shift is useful in avoiding common cause errors, that is, these are errors which can have a simultaneous effect on a plurality of processing units. Therefore, in FIG. 1b, component M640 is inserted, which delays the corresponding input by the phase shift. This delay element may be accommodated in the comparator, in order for this element to be used only in the comparative mode. Alternatively, or in addition, in order also to be able to tolerate asynchronicities, one may put intermediate buffers into the input chain. These may be designed as FIFO memories. If such a buffer is present, one can also tolerate asynchronicities up to the maximum depth of the buffer. In this case, an error signal has to be emitted, even when the buffer overflows.

Furthermore, the example comparator embodiments are able to be distinguished according to how signal M520 (or M620) is generated. In one example embodiment, input signals M510, M511 (or M610, M611) are applied to the output and the connection is made interruptible by switches. The particular advantage of these variant is that, for switchover between performance mode and possibly various comparative modes, the same switches may be used. Alternatively, the signals may also be generated from intermediate buffers internal to the comparator.

A last class of example embodiments may be distinguished to the effect of how many inputs are present at the comparator and how the comparator is to react. In the case of three inputs, a majority voting, a comparison of all three or a comparison of only two signals may be undertaken. In the case of four or more inputs, correspondingly more variants are conceivable. These variants may be coupled with the various operating modes of the overall system.

Figure 1C:
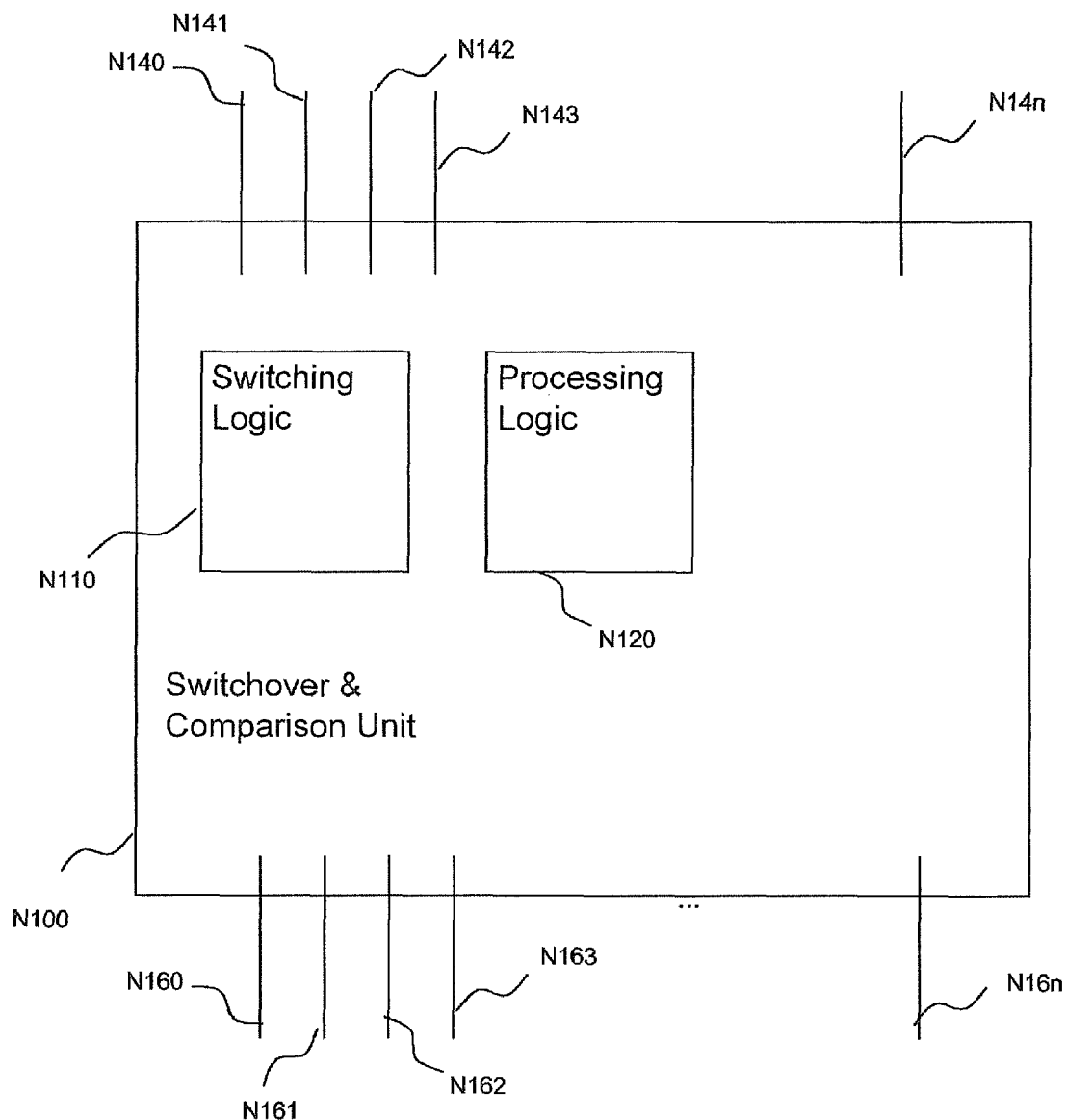
FIG. 1c shows a schematic representation of an example embodiment of a comparator.

In order to represent the general case, a generalized representation of a switchover unit and a comparative unit is shown in FIG. 1c, as it should preferably be used. Of the n execution units to be taken into account, n signals N140, ..., N14n go to switchover and comparison component N100. This is able to generate up to n output signals N160, ..., N16n from these input signals. In the simplest case, the "pure performance mode", all signals N14i are conducted to corresponding output signals N16i. In the opposite limiting case, "pure comparison mode", all signals N140, ..., N14n are guided to only precisely one of output signals N16i.

With the aid of FIG. 1c, it can be shown how the various conceivable modes may be created. To this end, each embodiment includes the logical component of a switching circuit logic N110. The component does not have to exist as such, but what is decisive is that its function is present. Switching circuit logic N110 first of all specifies how many output signals there are at all. Furthermore, switching logic N110 specifies which one of the input signals contribute to which one of the output signals. In this context, one input signal may contribute to exactly one output signal. Formulated differently in mathematical form, the switching circuit logic thus defines a function that assigns to each element of the set (N140, ..., N14n) an element of the set (N160, ..., N16n).

The function of processing logic N120 then specifies for each output N16i in which form the inputs contribute to this output signal. This component, too, need not be present as a separate component. Decisive is once again that the described functions are implemented in the system. In order to describe the different variation possibilities by way of example, it should be assumed without limiting the generality, that output N160 is generated by signals N141, ..., N14m. If m=1, this simply corresponds to switching of the signal, if m=2, signals N141, N142 are compared. This comparison may be implemented in a synchronous or asynchronous manner; it may be carried out bit-by-bit, or only to significant bits or even having a tolerance band.

If m≧3, there are several possibilities.

A first possibility is to compare all signals, and if at least two different values are present, to detect a fault, which may be optionally signaled.

A second possibility is to make a k-out-of-m selection (k>m/2). This may be implemented by the use of comparators. As an option, a fault signal may be generated when one of the signals is detected to be deviating. A fault signal that possibly differs therefrom may be generated when all three signals are different.

A third possibility is to provide these values to an algorithm. This may represent, for instance, the forming of an average value, a median value, or the use of a fault-tolerant algorithm (FTA). Such an FTA is based on deletion of extreme values of the input values and to implement a type of averaging over the remaining values. This averaging may be undertaken over the entire set of remaining values or over a partial set which is easy to form in HW. It is not always necessary in this case actually to compare the values. In the mean value generation, for instance, only addition and division is required; FTM, FTA or median require partial sorting. If appropriate, here, too, a fault signal may optionally be output given sufficiently high extreme values.

These different listed possibilities of processing a plurality of signals to one signal are denoted as compare operations, for the sake of briefness.

Thus, it is the task of the processing logic to establish the exact shape of the comparative operation for each output signal, and thus also for the associated input signals. The combination of the information of switching logic N110 (that is, the function named above) and the processing logic (that is, the establishment of the comparative operation per output signal, that is per functional value) is the mode information, and this determines the mode. In the general case, this information is naturally multi-valued, i.e., not representable by one logical bit only. Not all conceivable theoretical modes are meaningful in any given implementation, and preferably the number of allowable modes will be restricted. It should be emphasized that, in the case of only two execution units, where there is only one comparative mode, the whole information is able to be condensed to only one logical bit.

A switchover from a performance mode to a comparative mode is generally characterized in that execution units which are mapped to different outputs in performance mode, are mapped to the same output in comparison mode. Fortunately, this is implemented by there being a subsystem of execution units in which, in the performance mode, all input signals N14i, which are to be taken into account in the subsystem, are switched directly to the corresponding output signals N16i, whereas, in the comparative mode, all are copied towards an output. Alternatively, such a switchover may also be implemented by changing pairings. This shows, that in the general case, one is not able to speak of the performance mode and the comparative mode, although, in any given form of the present invention, the set of permitted modes can be limited to such an extent that this is the case. However, one may always speak of a switchover from the performance mode into the comparative mode (and vice versa).

Controlled by software, a dynamic switchover between these modes is possible during operation. In this context, the switchover is triggered, for example, via the execution of special switchover instructions, special instruction sequences, explicitly identified instructions or by the access to certain addresses by at least one of the execution units of the multiprocessor system.

Figure 2:
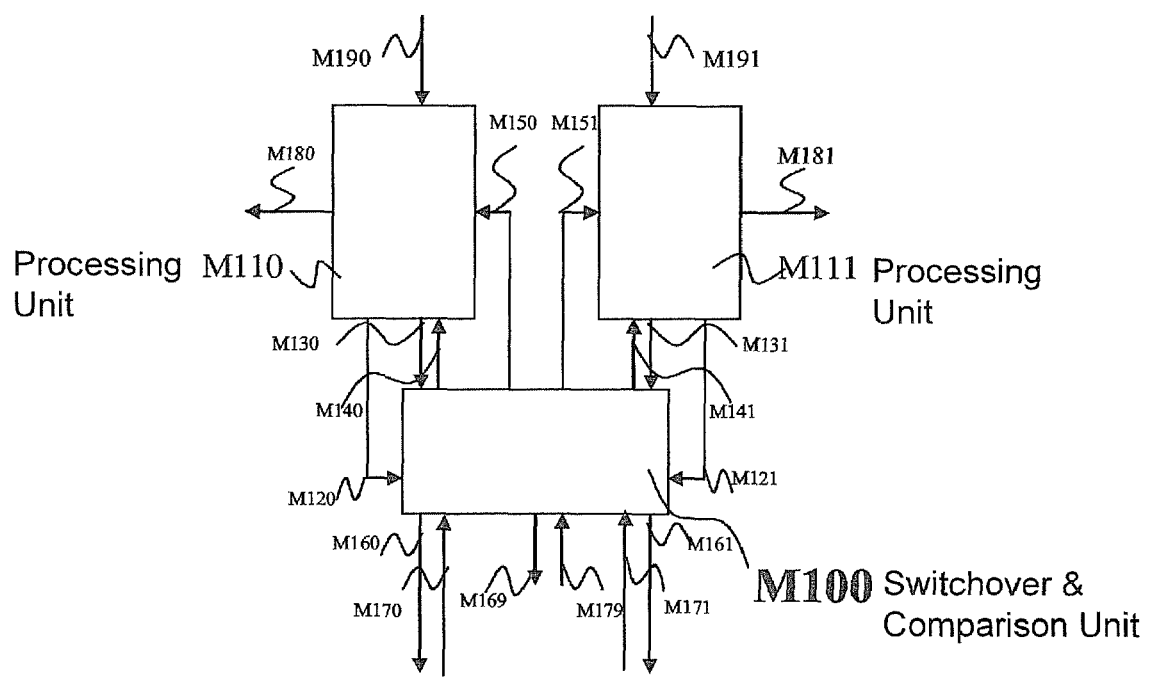
FIG. 2 shows a detailed representation of the switchover and comparative unit for two processing units.

FIG. 2 shows a two-processor system or a two μC system described in greater detail, having a switchover and comparative unit M100 according to the present invention, in which optionally various of the drawn-in signals may also be omitted. It is made up of two processing units (M110, M111) and one switchover and comparative unit M100. Data signals (M120, M121) and address/control signals (M130, M131) go from each processing unit to the switchover unit and each processing unit optionally also receives back data (M150, M151) and control signals (M140, M141) from the switchover unit. Unit M100 outputs data (160, M161) and status informations M169, and receives signals such as data (M170, M171) and control signals M179, which may also be passed on to the processing units. Optionally, the operating mode of unit M100 may also be set via M170, M171 and M179 independently of the processing units; likewise, the processors are able to set the operating mode in unit M100, via outputs M120, M121 (e.g. data bus) and control and address signals M130, M131 (e.g. write), for instance, performance mode (without comparison) or comparative mode (with comparison of signals M120, M121 and/or signals M170, M171, which may, for example, come from peripheral units). In the performance mode, outputs M120, M121 are also passed on to outputs M160, M161, possibly in conjunction with control signals, and in the opposite direction, the inputs M170, M171 to M150, M151. In the comparative mode, the outputs are compared and advantageously passed on only in the error-free case to M160, M161, optionally both outputs being used, or only one of the two. In the same way, monitoring input data M170, M171 is possible, which are passed on to the processing units. In the case of an erroneous comparison result of the signals in the operating mode, an error signal is generated and, for instance, using double-rail signals i.e., error-safe, signaled to the outside (component of status information M169). Status M169 may also include the operating mode or information about a shift in time of the signals of the embodiment units. In the case of not making available compare data of a processing unit in a specified (programmable) time interval, the error signal is also activated. In the case of an error, outputs M160, M161 can be blocked (fail-silent behavior). This may apply to digital as well as analog signals. However, these output driver stages are also able to output the undelayed (not buffer stored) output signals M120, M121 of a processing unit, having the possibility of subsequent error detection. This is tolerated by a safety-relevant system as long as the error tolerance time is not exceeded, that is, the time in which an (inert) system does not yet react catastrophically to errors, and therefore there is still the possibility of correction.

Output signals M180, M181, that are not guided into the UVE, and internal signals of a processing unit may also be compared at least with respect to their calculated value, by outputting this value at outputs M120, M121 for the purpose of comparison. The corresponding may also be carried out with input signals M190, M191, which do not come via M100.

In order to monitor unit M100, it may be possible for selected or even all signals M160, M161 to read them back via M170, M171 or even M190, M191. Thereby one may ensure even in the comparative mode that erroneous signals are detected from unit M100. Because of a suitable switch-off path, to which (in an OR link) M100, M110, M111 have access, a fail-silence behavior of the entire system may be produced.

Figure 3:
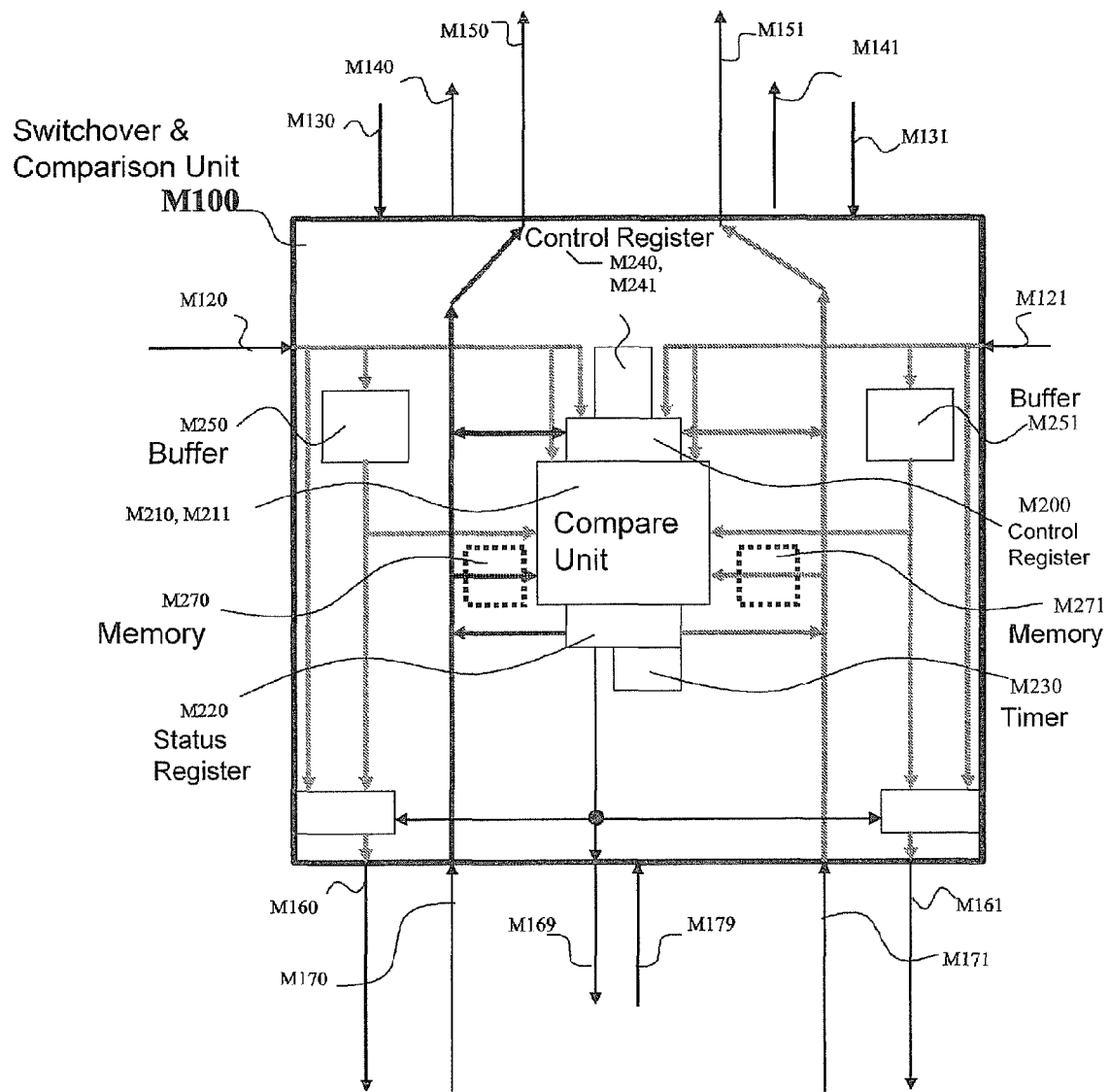
FIG. 3 shows an example implementation of a switchover and comparative unit for two processing units.

In FIG. 3, an example implementation of switchover and comparative unit M100 of FIG. 2 is shown in detail. Unit M100 includes a control register M200 having at least one bit, which represents the mode (performance/compare) and a status register M220 having at least one bit, which represents the error state in the comparative mode. The wait signals and interrupt signals are controlled by additional bits in the control register, respectively for both processing units. In this context, distinction has to be made possibly between various interrupts, such as for synchronization purposes, for preparing for the operating mode switchovers as well as for the error handling.

Optionally, there may be additional control registers, such as M240, which includes the maximum allowable time difference (in numbers of clock pulses) between the processing units for controlling an internal or external watchdog, as well as M241 having the time difference value (number of clock periods), beginning at which the fastest processor is to be intermittently stopped or delayed using WAIT signals or interrupt signals, in order, for example, to prevent an overflow of data registers.

In status register M220, besides the error bit, there is also stored, for instance, how great the clock pulse offset between the processing units is, instantaneously. To do this, for instance, at least one timer M230 is always started by one processing unit if one especially identified data word (e.g., determined via address signal and control signal) is first made available, and the value of the timer is always copied into the status register when the corresponding data value of the second processing unit is made available. Beyond that, the timer may be set in such a way that even at different program sequences corresponding to the WCET (worst case execution time) it is guaranteed that all processing units have to supply one data point. If the specified value of the timer is exceeded, an error signal is emitted.

Outputs M120, M121 of the processing units are to be stored in a buffer memory M250, M251 in M100, especially for the compare mode, if digital data are involved and they are not able to be made available with clock accuracy. This memory may be embodied as FIFO. If this memory only has a depth of 1 (register), one should take care, for instance, by wait signals, that the output of additional values is delayed until the comparison has taken place, in order to avoid a data loss.

In addition, there is a compare unit M210, which compares the digital data from input memories M250, M251, the direct inputs M120, M121 or M170, M171 with one another. This compare unit is also able to compare serial digital data (e.g., PWM signals) with one another, if, for instance, the serial data can be received in memory unit M250, M251 and converted to parallel data, which are then compared in M210. In the same way, asynchronous digital input signals M170, M171 are able to be synchronized via additional memory units M270, M271. Same as for input signals 120, 121, these are intermediately buffered in a FIFO. The switchover between performance mode and compare mode takes place by setting or resetting the mode bits in the control register, whereby, for instance, corresponding interrupts are caused in the two processing units. The comparison itself is caused by data M120, M121 that are made available, as well as the appertaining addresses and control signals M130, M131. In this context, certain signals from M120 and M130 or M121 and M131 are able to function as an identifier which indicates whether a comparison of the assigned data is to take place.

Figure 6:
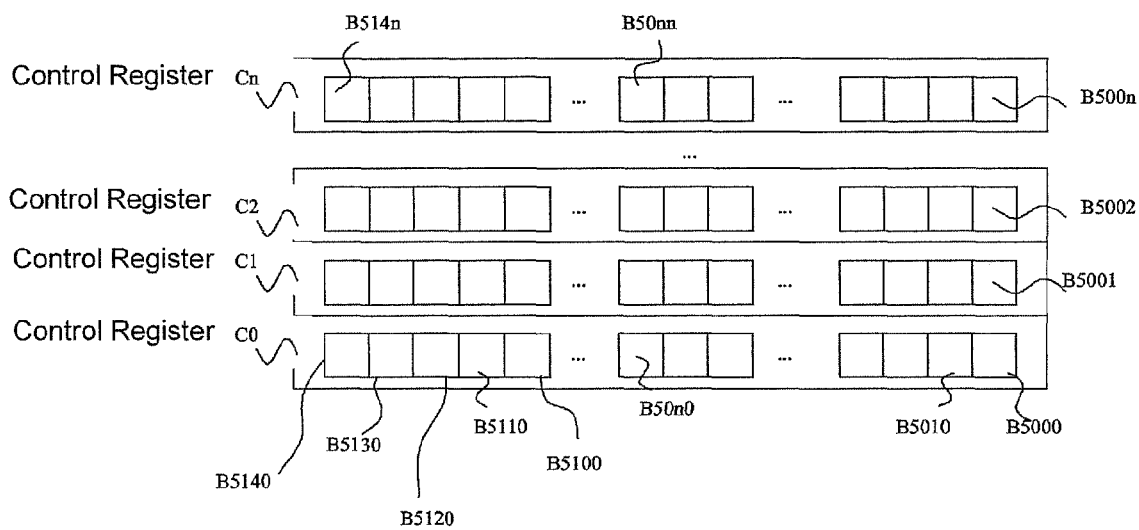
FIG. 6 shows an example implementation of a control register.

This is a further example embodiment compared to the simple switchover in FIG. 1. In this case, advantageously, various preparations should be taken during the transition into a compare mode using the interrupt routines, so that the same initial conditions are created for both processing units. When the processing unit is finished with this, its processor-specific ready-bit is set in the control register and the processing unit remains in the waiting state, until the other processing unit also signals its readiness by its ready-bit (see also description of the control register in FIG. 6).

Figure 12:
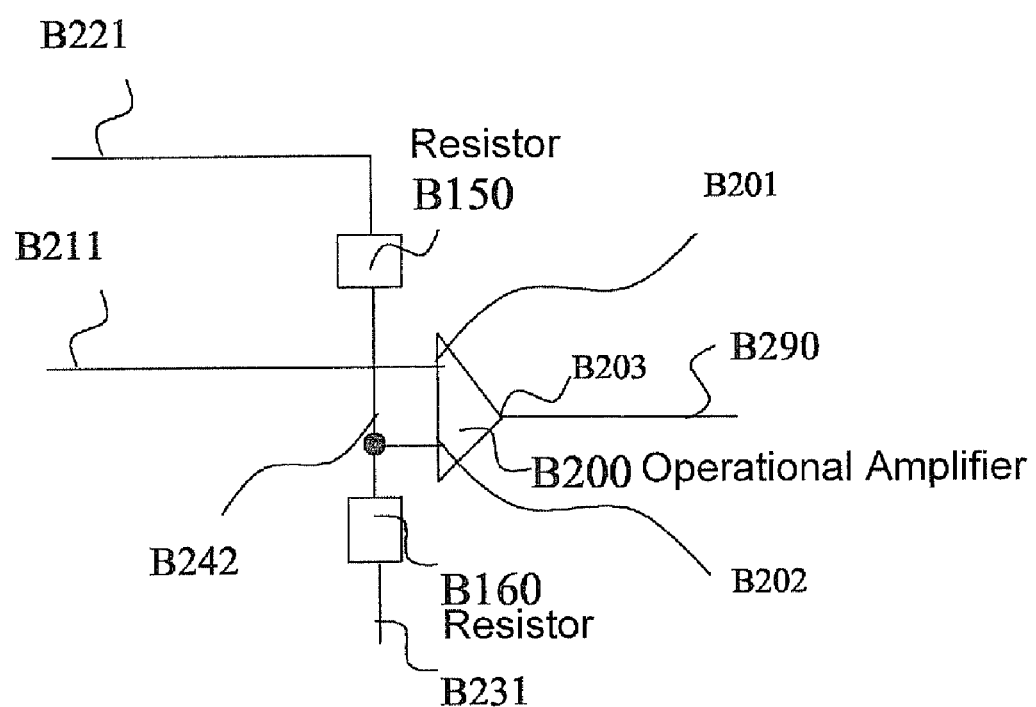
FIG. 12 shows a comparator for positive voltage difference.

In this compare unit analog data are also able to be compared to one another in an analog compare unit M211 that is specially suitable for this. But this presupposes that the output of the analog signals takes place sufficiently synchronously with one another, or that, in the analog compare unit, storage is provided of the digitized data by an ADC implemented there (for this, see further comments belonging with FIGS. 12 to 14). The synchronicity is able to be achieved by comparing to one another the digital outputs of the processing units (data, address signals and control signals) as described above, and by letting the processing unit, that is too fast, wait. For this purpose, one may also pass the digital signals, which are processed as source of the analog signals in the processing unit, via outputs M120, M121 to unit M100, although these signals are otherwise not needed externally. This redundant comparison in addition to the comparison of the analog signals takes care that an error in the computation is able to be detected earlier, and besides that, this simplifies the synchronization of the processing units. The comparison of the analog signals effects an additional error detection for the DAC (digital to analog converter) of the processing unit. In other structures of the DCSL architectures such a possibility does not exist. A comparison is also possible for analog input signals from the peripheral units. In particular, where redundant sensor signals of the same system parameter are involved, no additional synchronization measures are then required, but rather only possibly a control signal that indicates the validity of the sensor signals. The implementation of a comparison of analog signals will be shown in detail.

Figure 4:
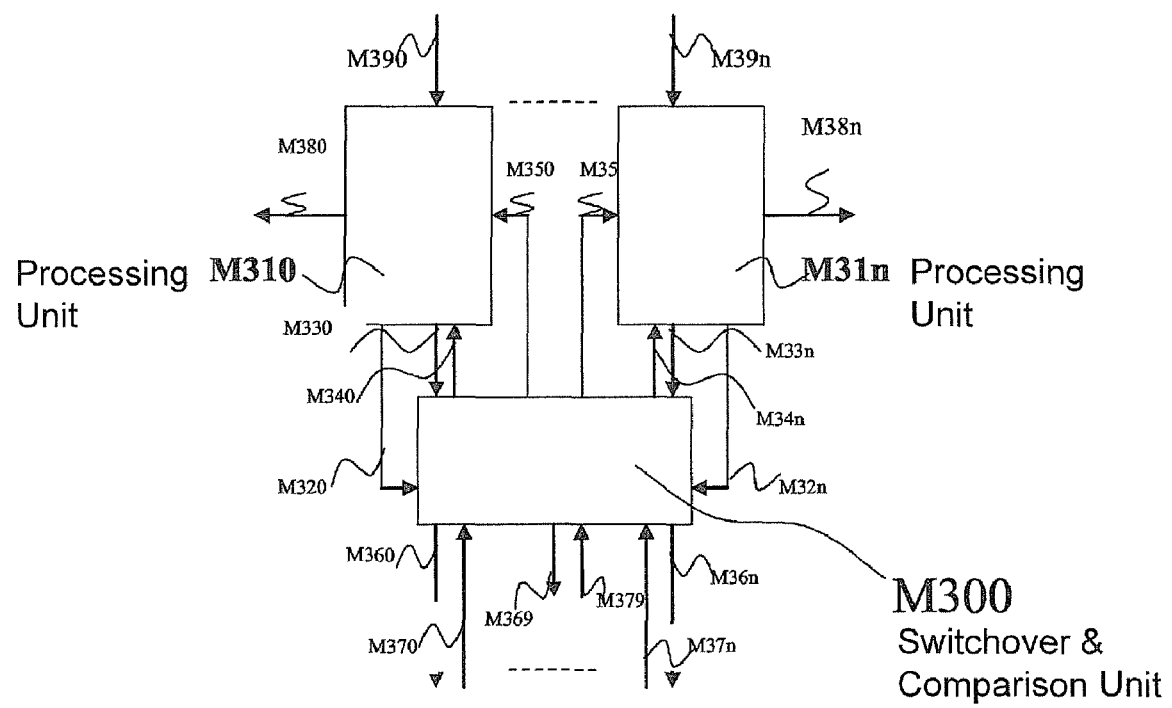
FIG. 4 shows a more detailed representation of a switchover and comparative unit for more than two processing units.

FIG. 4 shows a multiprocessor system having at least n+1 processing units, each of these components, in turn, being able to be made up of several sub-processing units (CPU's, ALU'S, DSP's having appropriate complementary components). The signals of these processing units are connected to a switchover and compare unit in exactly the same way as was described for the dual system as in FIG. 2. All components and signals in this figure therefore have the same meaning content-wise as the corresponding components and signals in FIG. 2. In the multiprocessor system, switchover and compare unit M300 is able to distinguish between the performance mode (all processing units process different tasks), various compare modes (the data of two or even more processing units should be compared, and in case of deviations, an error should be signaled) and various voting modes (voter-basis decision in response to a deviation, according to differently specifiable algorithms). In this context, it can be decided separately for each processing unit in which mode it is operating and together with which other processing units it is possibly operating in this mode. Exactly how the switchover takes place will be described further below, during the description of the control register as in FIG. 6.

Figure 5:
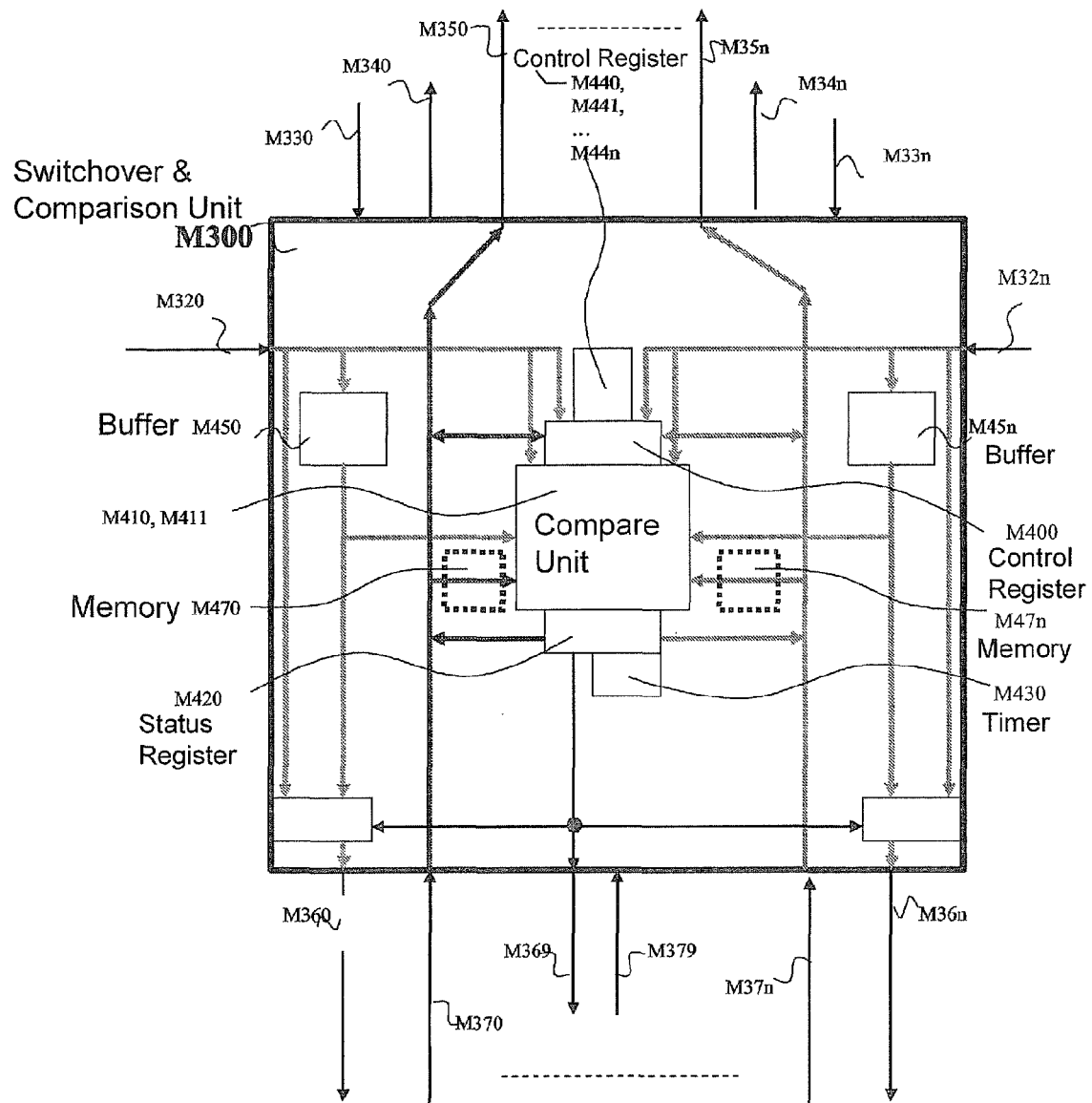
FIG. 5 shows an example implementation of a switchover and comparative unit for more than two processing units.

FIG. 5 shows an example implementation of a switchover unit for a multiprocessor system having n+1 processing units. For each processing unit, at least one control register M44$i$ is provided in the control unit of the switchover and compare module. A preferred set of control registers is shown and described in detail in FIG. 6. In this context, M44$i$ corresponds in each case to control register Ci.

Various embodiments of the control register are conceivable. It can be described via suitable bit combinations whether an error tolerance pattern should be used. Depending on the effort one puts into unit M300, one can additionally specify which type of error tolerance pattern (2 out of 3, median, 2 out of 4, 3 out of 4, FTA, FTM . . . ) one would like to use. Moreover, it can be configurably set up which output to switch through. Example embodiments may also be formed according to which components could have an influence on this configuration and for which piece of data.

The output signals of the participating processing units are then compared to one another in the switchover unit. Since the signals are not necessarily processed at clock accuracy, intermediate storage of the data is required. In this context, data can also be compared in the switchover unit which are passed to the switchover unit at a greater time difference by the various processing units. By the use of an intermediate storage (e.g., developed as a FIFO memory, first in-first out, or even in a different buffer form), first of all, a plurality of data may also be received by one processing unit, while other processing units are not making any data available yet. In this context, one measurement for the synchronicity of the two processing units is the occupancy of the FIFO memory. If a certain specifiable occupancy is exceeded, the processing unit that is most advanced in the processing is intermittently stopped either by a WAIT signal that is present or by suitable interrupt routines, in order to wait for the processing units that are making slower progress in the processing. The monitoring, in this context, should be extended to all externally available signals of a processing unit; this also includes analog signals or PWM signals. In the switchover unit, structures should be provided for this which permit making a comparison of such signals. It is provided additionally that a maximum time deviation between the data to be compared is specified and monitored using at least one timer.

In the general case, if more than two processing units are connected to one another by a common switchover unit, one control register is required for each of these processing units. A special execution of these control registers is explained in FIG. 6.

The (n+1) lower bits B500$x$ to B50$nx$ of the respective control register Cx are unequivocally assigned to the n+1 processors/processing units. Bit B514$x$ of control register Cx switches over between compare/voting on the one hand and parallel work on the other hand, and corresponds to the value of B16 from FIG. 1. Bit B513$x$ indicates whether the respective processing unit is ready for comparison (ready), bit B512$x$ controls synchronization signal (WAIT or INTERRUPT) and bit B511$x$ may be used to prepare the respective processing unit x for the comparison by an interrupt. Correspondingly, bit B5110$x$ controls an interrupt which switches the processing unit back into parallel mode.

If B50$ik$ and B50$kk$ of control register Ck are set to one, ($0 \leq i, k \leq n$), this means that, in this example embodiment, the outputs of processing unit i are to be compared to those of processing unit k. If, in addition, B50$jk$ is also equal to 1, then voting has to take place between i, j and k, and the voting result is output at output k of UVE ($0 \leq i, j, k \leq n$). For this purpose, for each group of processing units a special type of voting may be determined, or even only a plural comparison, as was enumerated before in the explanation for FIG. 4. In general, all bits B50$ik$ have to be set for processing units i that are to be compared/voted (in control register Ck), if the voting result is to be output at output k of UVE. It is possible to have a parallel output at other outputs.

A one in B50$ii$ of control register i ($0 \leq i \leq n$) indicates that output i of the compare unit is to be active. If all control registers Ci carry a one (i=0, 1, . . . n) only in the corresponding memory locations B50$ii$, then all processing units are working in performance mode using any different programs desired and their own output signals. If all n+1 lower bits B50$ik$ are equal to one (i=0, 1, . . . n), and if, besides, B514$k$ is set, then the output signals of all processing units are selected by voting, and output to output k of UVE; at n=1 only a comparison takes place.

In the following discussion it is described, for example, how a sequence can look during transition to a compare/voting in a system having several processing units.

Bit B514$i$ in control register Ci is set in order to activate the comparison or the voting. This bit may be set both by the processing unit itself and by the switchover and compare unit as a function of certain system states, time conditions or other conditions (such as accesses to certain memory regions, errors or implausibilities). If bits B50$ii$ and B50$ki$ are set with B514$i$, then bits B511$i$ and B511$k$ are automatically set by UVE, and interrupts are triggered thereby in processing units i and k. These interrupts have the effect that the processing units jump to a certain program location, carry out certain initialization steps for the transition to the compare mode, and then output a response (ready) to the switchover and compare unit. The ready signal has the effect of automatically resetting interrupt bit B511$i$ in respective control register Ci of the processing unit, and at the same time setting wait bits B512$i$. When all wait bits of the participating processing units have been set, they are simultaneously reset by the switchover and compare unit. The processing units then begin with the processing of the program parts that are to be monitored. In one advantageous example embodiment, writing into a control register Ci using a set bit B514$i$ is prevented by locking (HW or SW). In a meaningful way, this has the effect that the configuration of the comparison cannot be changed during processing. A change in control register Ci can only be made after resetting bit B514$i$. This resetting effects interrupts in the respective processing units by setting bits B510$x$ in the control registers of all participating processing units for transition to normal mode (parallel method of operation).

The consistency of all control registers with one another is monitored in accord with user specifications, and in case of an error, an error signal is generated which is a component of the status data. Thus, for example, what should not happen is that a processing unit is used at the same time for several independent comparing or voting processes, because synchronization is then not guaranteed. However, what is conceivable is a comparison of several processing units without an output of the data signals, but only for the purpose of generating an error signal in response to inequality.

In another example embodiment, the data input in several or all control registers of the processing units, participating in a comparison or a voting, is to be undertaken in the same way, that is, the corresponding bits of these processing units are to be set there in the same way, optionally with the exception of their own bit i, which controls the output.

Figure 7:
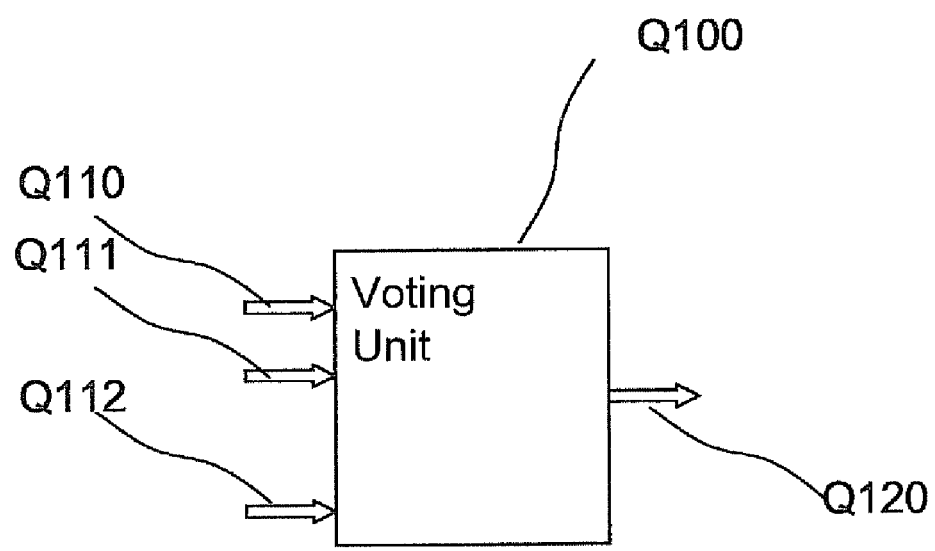
FIG. 7 shows a voting unit for centralized voting.

FIG. 7 shows voting unit Q100 for central voting. Voting may be carried out both by using suitable hardware and software. The voting algorithm (e.g., bit-accurate voting) should be specified for this. In this context, voting unit Q100 includes several signals Q110, Q111, Q112, and forms an output signal Q120 from these, which is created by voting (e,g, an m-of-n selection).

If an error occurs during the comparison, the error bit is set in the respective control register. During voting, the piece of data of the respective processing unit is ignored; during a simple comparison, the output is blocked.

All the data that are not available at the right time, before expiration of the programmed time, are treated as errors. Resetting of the error bits takes place as a function of the system, and optionally makes possible a reintegration of the respective processing unit.

Figure 8:
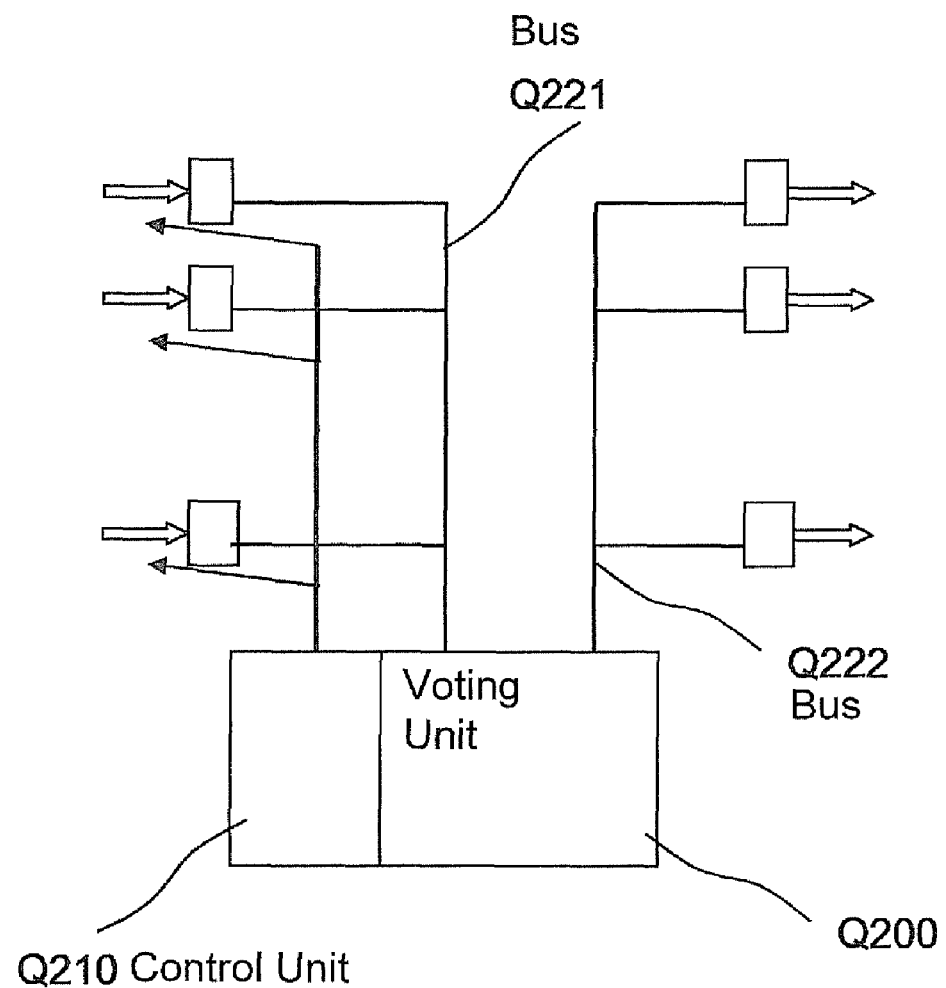
FIG. 8 shows a voting unit for decentralized voting.

In case the processing units and/or the voter are not situated in a spatially concentrated manner, decentralized voting is also possible, in connection with a suitable bus system according to FIG. 8. In FIG. 8, a decentralized voting unit Q200 is controlled by a control unit Q210. It is linked via a bus system Q221, Q222, receives data via this bus system and outputs them thereon.

The resetting of the compare bits and voting bits in a control register having active output bits has the effect of an interrupt in the participating processing units, which are then led back again into a parallel method of operation. In this context, each processing unit is able to have a different vector address which is controlled separately. The program processing can also take place then from the same program memory. However, the accesses are separate and to different addresses. If the security-relevant part is low in comparison the parallel modes, one should consider whether a dedicated program memory having a duplicated security part would perhaps require less expenditure.

The data memory is also able to be used in common, in performance mode. The accesses then take place one after another, for instance, using the AHB/ABP bus.

As a special matter we should still mention that the error bits have to be evaluated by the system. In order to assure the switching off in case of an error, the security-relevant should be implemented redundantly in a suitable form (for instance, in a one-of-two code).

Figure 9:
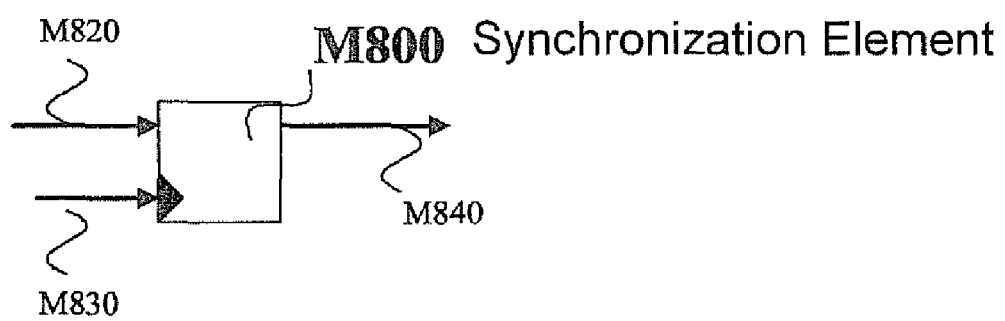
FIG. 9 shows a synchronization element.

In the UVE's up to now, according to FIGS. 1, 2, 3, 4 and 5, it was first of all assumed that the processing units worked using the same clock pulses or clock pulses derived from one another, which are at a constant phase relationship with respect to one another. If clock pulses from different oscillators and generators are also used for the processing devices, concerning which the phase relationships change, one has to synchronize the signals generated therewith if they change clock domains. For this, a synchronization element M800 is shown in FIG. 9. In order to store and to compare especially the digital data, synchronization devices M800 are then required which are able to be inserted at any place in the signal flow. For one thing, these assure the storage of data M820 using the clock pulse M830 of the processing unit which makes these data available. For reading, the clock pulse is then utilized, using which piece of data M840 is processed further. Such a synchronization step M800 may be constructed as FIFO, so that one is able to store a plurality of data (see FIG. 9). In the general case, the synchronization of the data alone is not sufficient, but the provisioning signal of the data has to be synchronized with the receiver clock.

Figure 10:
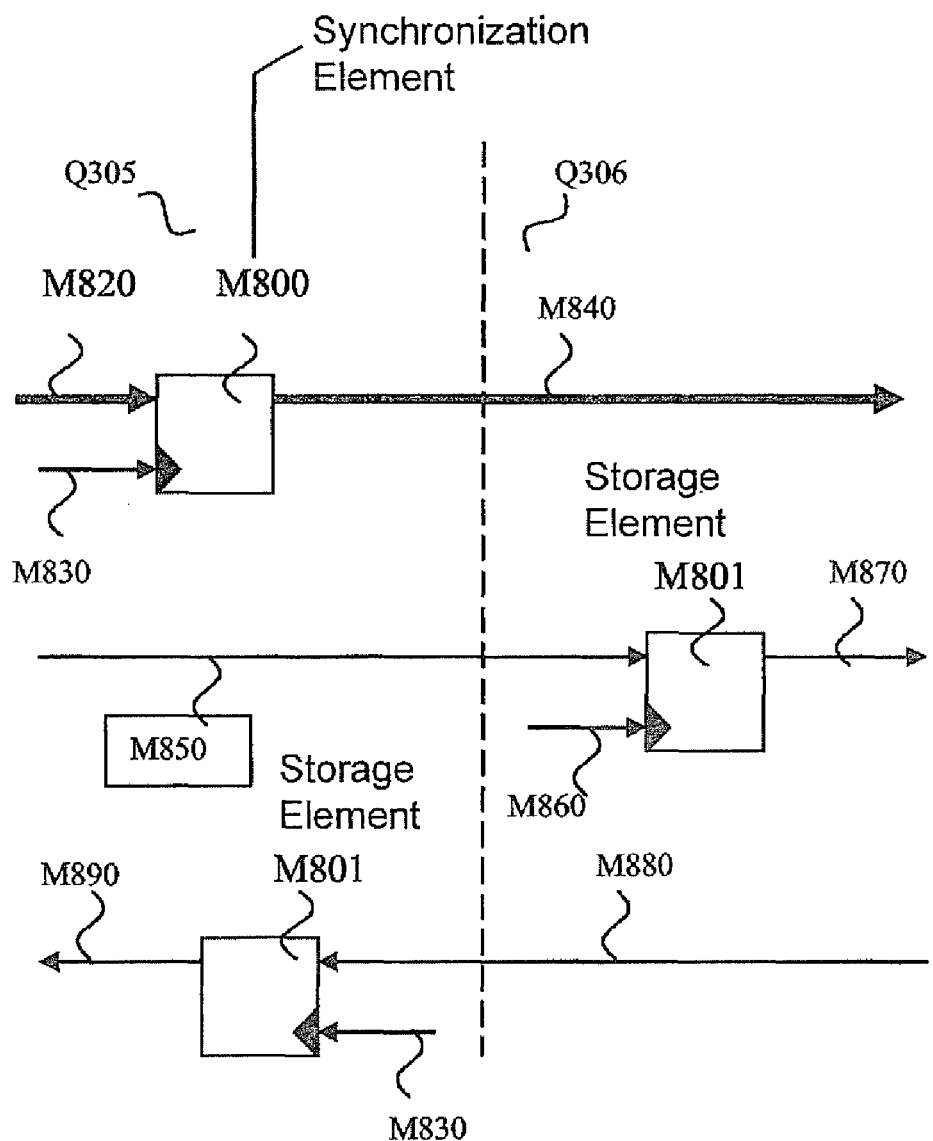
FIG. 10 shows a handshake interface.

For this, in addition, a handshake interface is required (FIG. 10), which assures the transfer by request signals M850 and acknowledge signals M880. Such an interface is always required when the clock domain changes, in order to assure a secure transfer of the data from one clock domain to the other. In this context, during writing, data M 820 from region Q305 are made available synchronized in register cells M800 using clock pulse M830, and a writing request signal M850 indicates the making available of the data. This writing request signal is copied by region Q306 using clock pulse M860 into a storage element M801, and as synchronized signal M870 it indicates the availability of the data. Using the next active clock pulse slope of clock pulse M860, synchronized piece of data M840 is then copied and in the process a confirmation signal M880 is sent back. This confirmation signal is synchronized, by clock pulse M830 in an additional storage element M801, to signal M890, and with that, making available the data is ended. New data are then able to be written into the respective register. Such interfaces, in example embodiments, are able to work particularly fast because of an additional coding, without having to wait for an acknowledge signal.

In one example embodiment, storage elements M800 are designed as FIFO memories (first in, first out).

The circuits for comparing analog signals from FIG. 11 through FIG. 14 assume that the processing units, that supply the analog signals that are to be compared, are synchronized with one another in such a way that the comparison is meaningful. The synchronization is able to be achieved by the corresponding signals B40 and B41 of FIG. 1.

Figure 11:
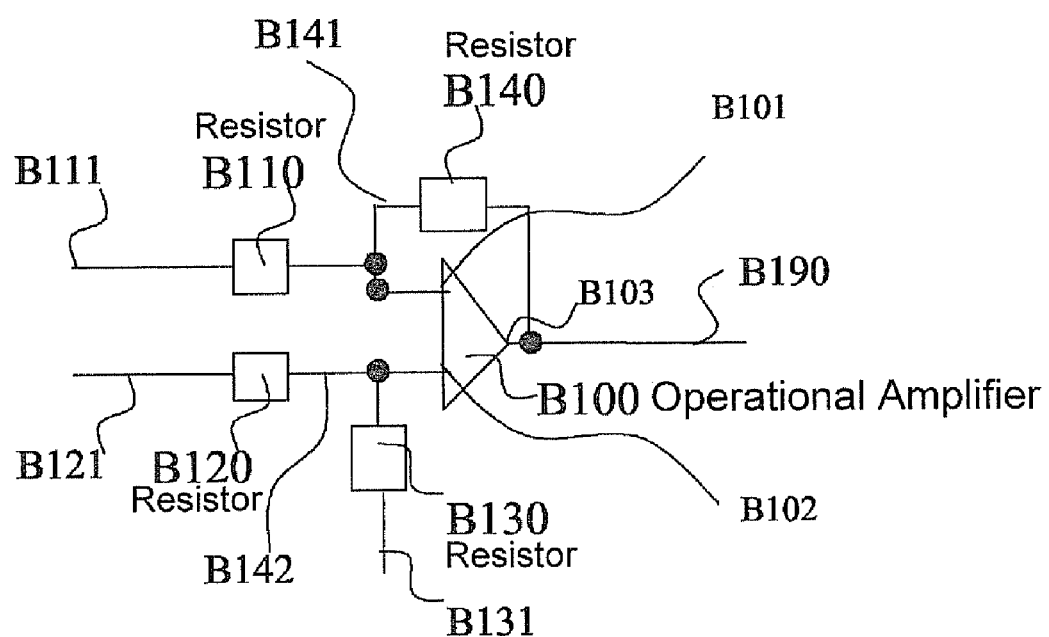
FIG. 11 shows a difference amplifier.

FIG. 11 shows a differential amplifier. With the aid of this element, two voltages are able to be compared to each other.

In this context, B100 is an operational amplifier to whose negative input B101 a signal B141 is connected, which is connected via a resistor B110 having the value $R_{in}$ to input signal B111, at which voltage value $V_1$ is present. Positive input B102 is connected to signal B142 which, via resistor 120 having the value $R_{in}$ is connected to input B121, at which the voltage value $V_2$ is present. Output B103 of this operational amplifier is connected to output signal B190, which has a voltage value $V_{out}$. Signal B190 is connected via resistor B140 having the value $R_f$ to signal B141, and Signal B142 is connected via resistor B130 having the value $R_f$ to signal B131, which bears the voltage value of the analog reference point $V_{agnd}$. The output voltage can be calculated using the above voltage and resistance values according to the following formula:

$$V_{out} = R_f/R_{in}(V_2 - V_1). \quad (1)$$

If the differential amplifier is operated only with a positive operating voltage, as is usual in the case of a CMOS, a voltage between the operating voltage and digital ground is selected as analog ground $V_{agnd}$, usually the average potential. If the two analog input voltages $V_1$ and $V_2$ are only slightly different, output voltage $V_{out}$ will have only a slight difference $V_{diff}$ from the analog ground (positive or negative).

Figure 13:
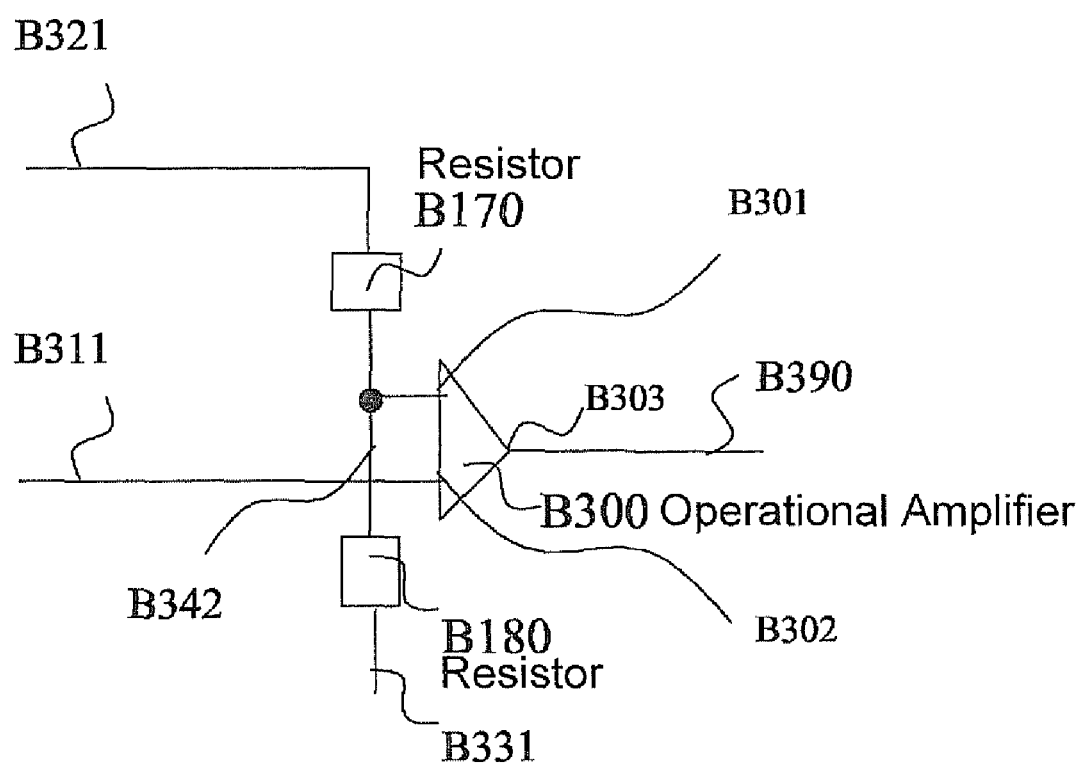
FIG. 13 shows a comparator for negative voltage difference.

With the aid of two comparators it is now tested whether the output voltage lies above $V_{agnd} + V_{diff}$ (FIG. 12) or below $V_{agnd} - V_{diff}$ with respect to the analog reference point (FIG. 13). In this context, in FIG. 12, input signal B221 is connected via resistor B150 having the value $R_1$ to signal B242, which is connected to positive input B202 of operational amplifier B200. Furthermore, signal 242 is connected via resistor B160 having the value $R_2$ to signal B231, which is utilized as digital reference potential $V_{dgng}$. Negative input B201 of the operational amplifier is connected to input signal B211, which bears the voltage value of a reference voltage $V_{ref}$. Output B203 of operational amplifier B200 is connected to output signal B290, which has a voltage value $V_{oben}$.

In FIG. 13, correspondingly, input signal B321 is connected via resistor B170 having the value $R_3$ to signal B342, which is connected to negative input B301 of operational amplifier B300. This signal B342 is also connected via resistor B180 having the value $R_4$ to signal B331, which also bears the digital reference potential $V_{dgnd}$. Positive input B302 of operational amplifier B300 is connected to input signal B311, which bears the voltage value of a reference voltage $V_{ref}$. Output B303 of operational amplifier B300 is connected to output signal B390, which bears a voltage value $V_{unten}$.

This is achieved by dimensioning resistors B150, B160, B170 and B180 with their values $R_1$, $R_2$, $R_3$ and $R_4$ with relation to fixed reference voltage $V_{ref}$ which is present at signals B211 and B311, as follows:

$$V_{ref} = (V_{agnd} + V_{diff}) * R_2/(R_1 + R_2) \quad (2)$$

$$V_{ref} = (V_{agnd} - V_{diff}) * R_4/(R_3 + R_4) \quad (3)$$

$$V_{diff} = ((V_{2max} - V_{1min}) * R_f/R_{in}) - V_{agnd} \quad (4)$$

In this context, $V_{2max}$ is designated as the maximum tolerated voltage value of $V_2$ at signal B121, and $V_{1min}$ is designated as the minimum tolerated voltage value of $V_1$ at signal B111. The reference voltage source may be made available externally, or implemented by an internally implemented bandgap (temperature-compensated and operating voltage-independent reference voltage). In equation (4), the maximum tolerated difference $V_{diff}$ is determined from the maximum positive deviation $V_{2max}$ and the appertaining maximum negative deviation $V_{1min}$, that is, $(V_{2max} - V_{1min})$ is the maximum tolerated voltage deviation of redundant analog signals from one another, that are to be compared to one another.

Figure 14:
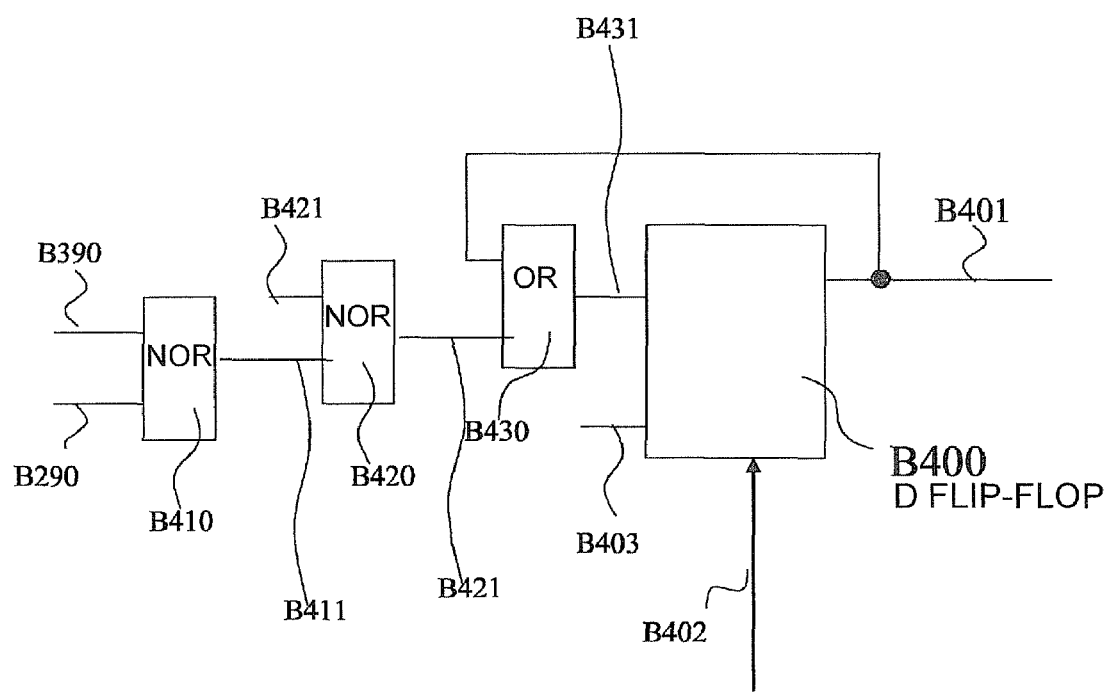
FIG. 14 shows a circuit for storing an error.

If one of the voltage values at the two signals B290 or B390 ($V_{oben}$ or $V_{unten}$) becomes positive, then there is a greater deviation of the analog signals present than should be tolerated. If the processors which supply these analog signals are synchronized, an error is thus present that has to be stored, and could possibly lead to the switching off of the output signals. The synchronicity is a given if, for instance, the ready signal in the control register of the corresponding processing units is active, or certain digital signals are sent to the UVE which signal a certain state of the respective analog signal, and with that also the value to be compared, in the sense of an identifier. A circuit that stores the error is shown in FIG. 14. In this circuit, the two input signals B390 and B290 are linked via a NOR circuit (logical OR circuit having subsequent inversion) B410 to output signal B411. This signal B411 is linked to input signal B421 in an additional NOR element B420 to form output signal B421. This signal B421 is linked in an OR circuit B430 with signal B401 to form signal B431, which is used as input signal for storage element (D flip-flop) B400. Output signal B401 of this element B400 indicates an error, using the value 1. D flip-flop B400 stores a 1, using clock pulse B403, if one of the two voltage values $V_{unten}$ or $V_{oben}$ is present positively at signals B390 or B290, that is, as digital signal bears the value high, signal B421 is not active and no reset signal B402 is present. The error remains stored until the signal reset has at least once been active. In the dimensioning of the circuits of FIGS. 11 through 13 it should be observed that the resistors match one another, that is, the resistor ratios of $R_f$ and $R_{in}$, $R_1$ and $R_2$ as well as $R_3$ and $R_4$ are constant, to the greatest extent independent of manufacturing tolerances. Using signal B421, one is able to control whether the circuit is to be active, or just then a synchronization of the processing units is taking place in which no comparison is to be made. Signal B402 resets a previous error and thereby makes possible a new comparison.

Figure 15:
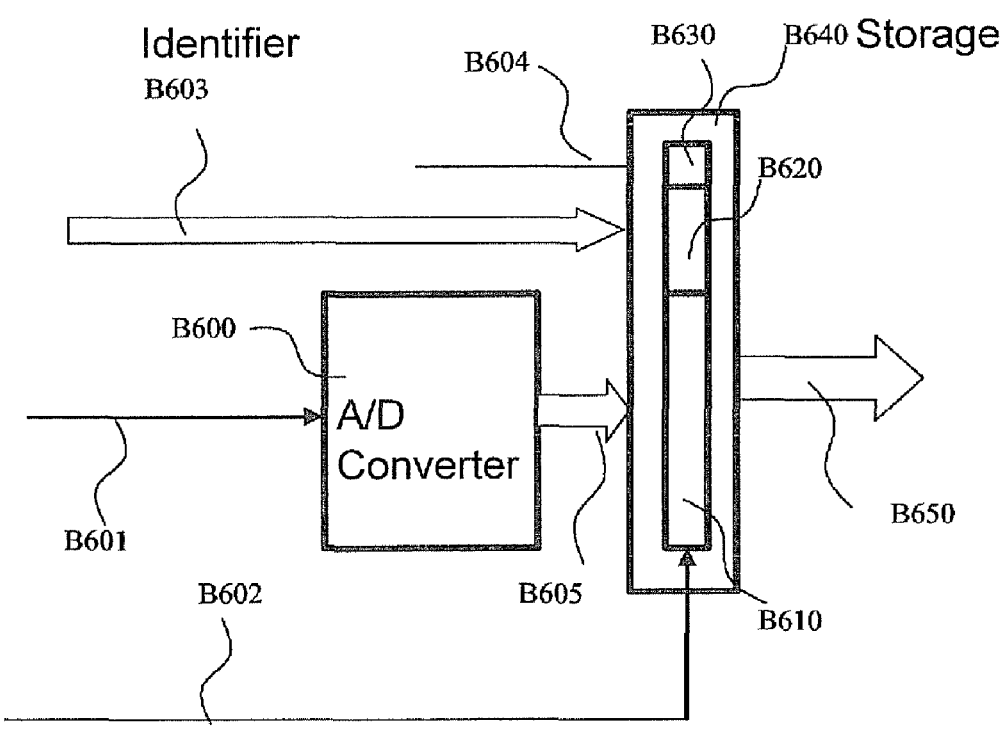
FIG. 15 shows an analog-to-digital converter having an output register.

FIG. 15 shows an ADC. This ADC is able to be implemented, depending on the existing requirements, for instance, with respect to conversion speed, accuracy, resolution, resistance to interference, linearity and frequency spectrum, using various conversion methods. Thus, one may, for example, select the principle of successive approximations, in which the analog signal is compared to a generated signal from a digital-to-analog converter (DAC) using a comparator, the digital input bits of the DAC being set experimentally from the MSB (most significant bit—highest value bit) to the LSB (least significant bit—lowest value bit) to high, and being reset again exactly when the analog output signal of the DAC has a higher value than the analog input signal (the signal to be converted). The DAC controls with its digital bits, from LSB to MSB, either resistors or capacitors having weightings 1, 2, 4, 8, 16, . . . in such a way that the setting of the next highest bits always has twice as great an effect on the analog value as the previous one. After all bits have been experimentally set and possibly reset again, the value of the digital word corresponds to the digital representation of the analog input signal.

For higher speed requirements, in the case of continuous data streams, a converter may also be used which continuously processes the analog signal and emits a serial digital signal which approaches this analog data stream of the serial bit sequence. The digital word is here represented by the bit sequence stored in a shift register. However, such converters are used on the assumption that, during the converting period, steady changes in the analog signal take place, because they cannot process constant values.

For low speed requirements, converters according to a counting principle may also be used which, for instance, using the input voltage or the input current have the effect of a corresponding constant charging or discharging of a capacitor connected to an integrator. The time required for this is measured and put into relation with the time necessary in the opposite direction for discharging or charging the same capacitors (integrators) using a reference voltage source or a corresponding reference current. The time unit is measured in clock pulses, and the number of clock pulses required is a measure for the analog input value. Such a method is, for instance, the dual slope method, in which the one slope is determined by the discharge corresponding to the analog value, and the second slope is determined by the reloading corresponding to the reference value.

Figure 16:
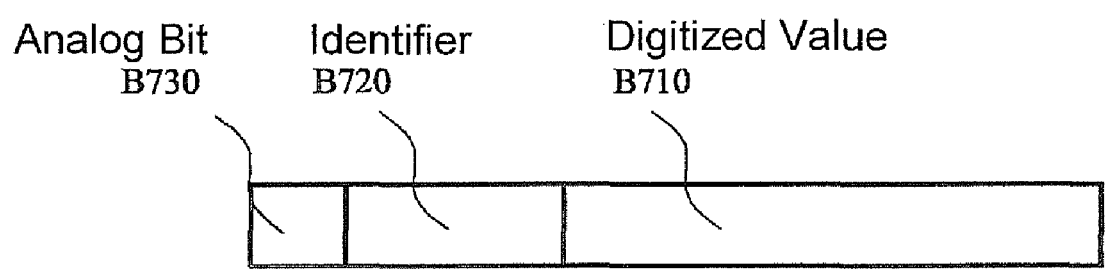
FIG. 16 shows a representation of a digitally converted analog value having an identifier and analog bit.
Figure 17:
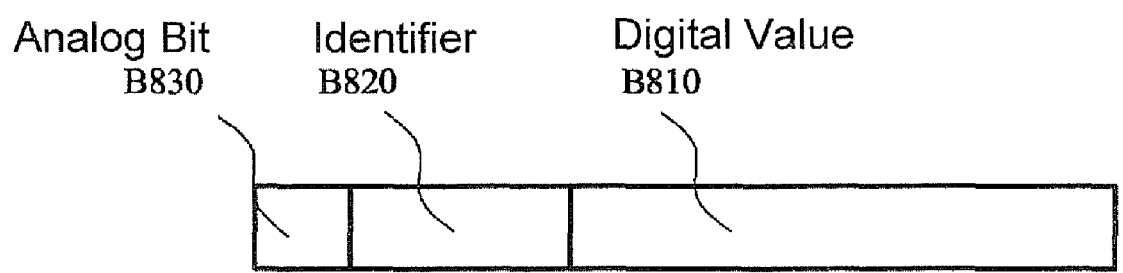
FIG. 17 shows a representation of a digital value as digital word having a digital bit.

ADC B600 in FIG. 15 is controlled by a trigger signal B602, which is usually an output signal of the processor which makes available the analog signal and optionally an identifier B603 which gives information on the type of the analog signal that is just being provided, in order to make possible making the distinction between a plurality of analog signals. Using trigger signal B602, the converted analog word is copied into storage region B640 as digital value into a register B610 and optionally together with identifier B603, which is stored in B620, and perhaps an additional signal B604 (that is 1 for the identification of an analog value), which is stored in memory B630. Storage region B640 may advantageously also be implemented as FIFO (first in, first out), if a plurality of values are to be stored, and the value stored first is also emitted first again. If storage region B640 is used both for digital and digitized analog values, advantageously all digital values are supplemented by one bit A=0 at the MSB location, corresponding to B630, in order to distinguish them from digitized analog values having A=1 (B630) (see FIGS. 16 and 17). Both B602 and B603 are components of digital output data $O_i$ of a processor i. In FIG. 16, the parts of the stored digitized analog value are shown separately, as they are stored in the storage region. In this context, B710 is the digitized analog value itself, B720 is the appertaining identifier and B730 is the analog bit which, in this case, is to be stored as 1. FIG. 17 shows a variant of a digital value stored in the same storage region. In B810, the digital value itself is stored, in B820 an identifier is stored optionally for this, which, for instance, gives information on whether the digital word is to be compared at all or whether it may also include further conditions for the comparison. The value 0 is then stored in order to characterize that a digital value is involved.

For the comparison of the intermediately stored digital and analog signals, the sequence of the storing and possibly the A bit (B730 or B830) as well as identifier B720 or B820 is checked in connection with converted digital value B710 or digital value B810. There is also the possibility, for instance, because of a different bit width, of accommodating the analog and the digital signals in separate memories (two FIFO's). The comparison then takes place in an event-controlled manner: whenever a value of a processor is transmitted to UVE, it is checked whether the other participating processors have already made available such a value. If that is not the case, the value is stored in the corresponding FIFO or memory, and in the other case the comparison is carried out directly, the FIFO being able to be used here too as the memory. For example, a comparison is always finished when the participating FIFO's are not empty. In the case of more than two participating processors or compare signals, it may be ascertained by voting whether all signals are admitted for distribution (failsilent behavior) or whether perhaps the error state is signaled only by an error signal.

What is claimed is:

1. A method for performing switching and data comparison in a computer system having at least two processing units which each process data at a specified clock pulse, comprising:

providing a switch-over unit operatively connected to the at least two processing units, for switching between at least two operating modes of the computer system, wherein the at least two operating modes include a first operating mode corresponding to a compare mode and a second operating mode corresponding to a performance mode;

providing a synchronization arrangement operatively connected to the at least two processing units, for assigning to specified data a clock pulse information as a function of a processing unit; and providing a comparison arrangement operatively connected to the at least two processing units for performing data comparison of data generated by the at least two processing units, wherein the comparison arrangement takes into consideration the clock pulse information of the specified data.

2. The method as recited in claim 1, further comprising:
storing the specified data having the assigned clock pulse information in a storage unit of the synchronization arrangement.

3. The method as recited in claim 1, further comprising:
processing the specified data as a function of the clock pulse information assigned to the specified data.

4. The method as recited in claim 3, wherein making available the specified data takes place as a function of the clock pulse information assigned to the specified data.

5. The method as recited in claim 3, further comprising:
buffering the specified data before inputting into the comparison arrangement.

6. The method as recited claim 3, further comprising:
providing a handshake interface, whereby a data reception is acknowledged.

7. The method as recited in claim 3, further comprising:
providing, by a compare signal, an indication that a next piece of output data is to be compared.

8. The method as recited in claim 3, further comprising:
providing an identifier which is assigned to a unit of data that is to be compared, wherein the data comparison is triggered by the provision of the identifier.

9. A device for performing switching and data comparison in a computer system having at least two processing units which each process data at a specified clock pulse, comprising:

a switch-over unit operatively connected to the at least two processing units, for switching between at least two operating modes of the computer system, wherein the at least two operating modes include a first operating mode corresponding to a compare mode and a second operating mode corresponding to a performance mode;

at least one synchronization arrangement operatively connected to the at least two processing units, for assigning to specified data a clock pulse information as a function of a processing unit; and a comparison arrangement operatively connected to the at least two processing units for performing data comparison of data generated by the at least two processing units, wherein the comparison arrangement takes into consideration the clock pulse information of the specified data.

10. The device as recited in claim 9, wherein the synchronization arrangement includes at least one storage unit for storing the specified data having the assigned clock pulse information.

11. The device as recited in claim 10, wherein the storage unit is at least one FIFO memory.

12. The device as recited in claim 9, wherein each of the two processing units is assigned a corresponding synchronization arrangement.

13. The device as recited in claim 9, wherein the switch-over unit and the comparison arrangement are assigned to each other.

14. The device as recited in claim 9, further comprising:
at least one input buffer memory for buffering data before input into the comparison arrangement.

15. The device as recited in claim 9, further comprising:
a handshake interface for acknowledging a data reception.

* * * * *